Jan. 10, 1939.   E. NISSES-GAGNÉR   2,143,631
SPOON BAIT
Filed Oct. 8, 1937
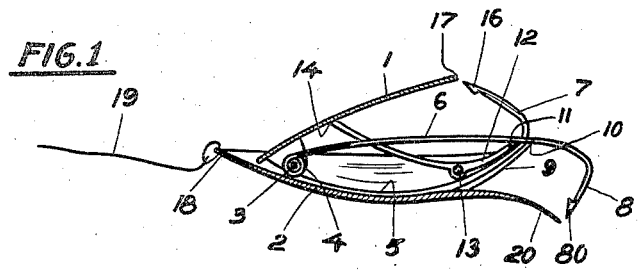
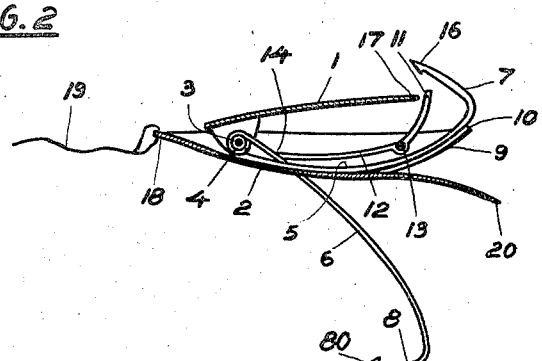
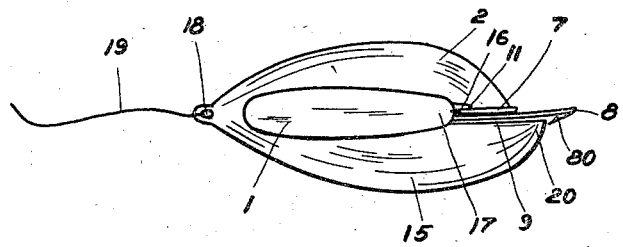
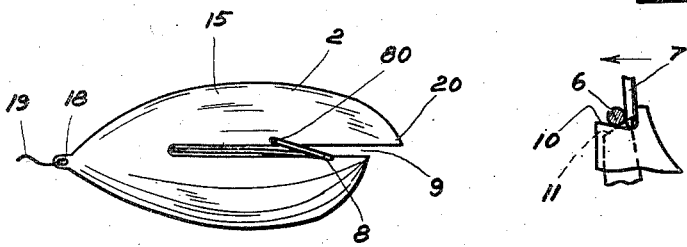
E. Nisses-Gagnér
Inventor
By: Glascock Downing & Seebold
Attys.

Patented Jan. 10, 1939

2,143,631

UNITED STATES PATENT OFFICE 2,143,631

SPOON BAIT

Erik Nisses-Gagnér, Goteborg, Sweden

Application October 8, 1937, Serial No. 168,064
In Sweden October 15, 1936

3 Claims. (Cl. 43—35)

This invention refers itself to spoon baits, intended especially for catching of pikes or similar fishes, and provided with one or more hooks which are housed between two movably jointed shields when the implement is pulled through the water, for the purpose to prevent reeds or weeds to entangle the hooks, but which are automatically uncovered as soon as the shields get compressed when bitten by a fish.

In the accompanying drawing an embodiment of this invention is illustrated, whereby Figure 1 shows a sectional elevation of the implement in idle position;

Figure 2 shows the same view but with the hooks released and operative;

Figure 3 is a plan view from above with regards to Figures 1 and 2;

Figure 4 is a plan view from below; and

Figure 5 a detail in cross section and on an enlarged scale.

In the drawing, 1 and 2 designate two shields pivotally jointed by a transverse pin 3 which is secured to the cup shaped inside of shield 2, while shield 1 is dwarfed to a rather narrow tongue. About the pin 3 there is wound a spiral spring 4, the one end of which is extended to a shank 6 for a hook 8 with barb 80. The opposite end of spring 4 bears against the inside of shield 2 and preferably is extended to a shank 7 secured to the inside of shield 2 for instance by solder. Shank 5 terminates in a hook 7 with barb 16. The entire hook shank 6 ought to be springy, and its attachment on pin 3 by aid of spring 4 must be such that the hook 8, when released, tends to spring out through a lengthy slot 9 in shield 2 into the operative position shown in Figure 2.

The free end of the one half portion of the shield 2, as divided by slot 9, is cut off in such a way that it forms an inclined member 10 positioned crosswise to the hook shank 6 and sloping down from its outer edge off the slot 9 as clearly visible in Figure 5. Close by this stationary inclined member 10 there is another inclined member 11 both of which have inclined outer edges and which members are inclined in opposite directions, as is also visible in Figure 5. The inclined member 11 is formed at the one end of a bell crank lever 12 which is hinged on a pin 13 secured to the inside of shield 2 parallel to pin 3, while the opposite end 14 of lever 12 supports the tongue like shield 1 when the implement is set so as shown in Figure 1 with the hooks 8, 7 housed within the shields. In this position of lever 12 the springy shank 6 of hook 8 rests on the two adjoining inclined members 10 and 11 as visible in Figures 1 and 5, in which position the implement is retained by the pressure exerted by spring 4 and its springy extension or shank 6 on the various cooperating members. In this position of the implement the barb 16 of the stationary hook 7 lies close by the free end 17 of shield 1 (Figure 1).

The free end 20 of the other half 15 of the slotted shield 2 is twisted like a screw propeller blade for the purpose to impart a swirling motion to the implement when pulled forwards by the fish line 19 which is attached in an eye 18 on shield 2.

The instrument operates as follows, when it is pulled ahead by line 19 with the movable parts set in the idle position illustrated in Figures 1 and 5. As soon as a fish bites across the two shields 1 and 2 the hinged shield 1 collapses against shield 2, whereby the lever 12 is tilted on its pin 13, resulting therein, that the inclined member 11 pushes the hook shank 6 aside in the direction of the arrow in Figure 5 so much that said shank is thrown off the stationary inclined member 10. By this release, the hook 8 is swung into operative position shown in Figure 2 by action of spring 4. The collapse of shield 1 also frees the barb 16 of the stationary hook 7 from protection of shield end 17, and thus both hooks 8 and 7 are able to force their barbs 80 and 16, respectively, into the mouth of the fish.

The considerable divergence in width of the two shields 1 and 2 causes the fish to bite the assemblage in such an oblique direction that the hinged shield 1 in all circumstances is influenced sufficiently to yield so much that the aforesaid releasing of the hook shank 6 is secured.

I am anxious to point out that I do not wish to limit my invention exactly to the design shown and described, but I want to vary the details thereof in different ways without departing from the scope of the following claims.

What I claim is:

1. In a spoon bait, a housing comprising two shields hinged together, one shield being provided with a lengthy slot, a barbed hook with a rather long shank pivotally housed between the two shields, two inclined members having inclined outer edges arranged close by one another and inclined in opposite directions, the one of said inclined members being stationary, and the other inclined member being movable, said two inclined members in a certain position serving as a common support for said hook shank when housed inoperative between said two shields, and means to displace said movable inclined member relatively to the stationary inclined member so as to release said hook shank and to swing said hook into operative position outside the shields.

2. In a spoon bait, a housing comprising two shields hinged together, one shield being provided with a lengthy slot, a barbed hook with a rather long shank pivotally housed between the two shields, means to temporarily retain said hook shank unstable within said housing in inoperative position, means to release said shank, spring means to swing said hook out through said slot with its barb in operative position outside the shields, a second barbed hook, means to retain said second barbed hook in inoperative position protected by one of said shields, and means to release said second barbed hook.

3. In a spoon bait, a housing comprising two shields hinged together, a barbed hook with a rather long shank pivotally housed between the two shields, two inclined members arranged close by one another and inclined in opposite directions, the one of said inclined members being stationary, and the other inclined member being movable, the movable member constituting one arm of a bell crank lever, the bell crank lever including another arm for supporting one of said shields with the two hooks housed within said shields, thereby said two inclined members serving as a common support for the shank of the first mentioned hook, means to tilt said bell crank lever so as to release said hook shank, spring means to swing said hook into operative position outside the shields, a second barbed hook, means to retain said second barbed hook in inoperative position protected by the one of said shields, and means to release said second barbed hook.

ERIK NISSES-GAGNÉR.